US011113271B2

(12) United States Patent
Zhuo et al.

(10) Patent No.: US 11,113,271 B2
(45) Date of Patent: Sep. 7, 2021

(54) METHODS AND DEVICES FOR PERFORMING OFF-CHAIN TESTING ON SMART CONTRACT

(71) Applicant: Advanced New Technologies Co., Ltd., Grand Cayman (KY)

(72) Inventors: Haizhen Zhuo, Zhejiang (CN); Honglin Qiu, Zhejiang (CN)

(73) Assignee: Advanced New Technologies Co., Ltd., Grand Cayman (KY)

( * ) Notice: Subject to any disclaimer, the term of this patent is extended or adjusted under 35 U.S.C. 154(b) by 0 days.

(21) Appl. No.: 16/721,265

(22) Filed: Dec. 19, 2019

(65) Prior Publication Data
US 2020/0285633 A1  Sep. 10, 2020

Related U.S. Application Data

(63) Continuation of application No. PCT/CN2019/076883, filed on Mar. 4, 2019.

(51) Int. Cl.
*G06F 16/23* (2019.01)
*G06Q 20/38* (2012.01)
(Continued)

(52) U.S. Cl.
CPC .......... *G06F 16/2379* (2019.01); *G06F 9/54* (2013.01); *G06F 16/2365* (2019.01);
(Continued)

(58) Field of Classification Search
CPC .... G06F 16/2379; G06F 16/2365; G06F 9/54; G06Q 20/389; H04L 9/0637; H04L 9/0643; H04L 2209/38
(Continued)

(56) References Cited

U.S. PATENT DOCUMENTS 10,146,792 B1 * 12/2018 Dobrek .............. G06Q 20/3829
2018/0005186 A1 * 1/2018 Hunn .................. G06Q 30/0283
(Continued)

FOREIGN PATENT DOCUMENTS

CN      107147704 A    9/2017
CN      107464118 A    12/2017
(Continued)

OTHER PUBLICATIONS

Karamitsos, Ioannis, et al., "Design of the Blockchain Smart Contract: A Use Case for Real Estate", Journal of Information Security, vol. 9, Jun. 29, 2018, pp. 177-190.*
(Continued)

*Primary Examiner* — Robert Stevens
(74) *Attorney, Agent, or Firm* — Finnegan, Henderson, Farabow, Garrett & Dunner, LLP

(57) ABSTRACT

Disclosed herein are methods, devices, and apparatuses, including computer programs stored on computer-readable media, for performing an off-chain testing on a smart contract. One of the methods includes: generating execution environment information for the smart contract, the execution environment information including at least one of transaction context information, blockchain information, or state information; providing an interface between the generated execution environment information and the smart contract; executing the smart contract based on the generated execution environment information and the provided interface; and storing an execution result of the smart contract.

17 Claims, 5 Drawing Sheets

(51) Int. Cl.
*G06F 9/54* (2006.01)
*H04L 9/06* (2006.01)

(52) U.S. Cl.
CPC ......... *G06Q 20/389* (2013.01); *H04L 9/0637* (2013.01); *H04L 9/0643* (2013.01); *H04L 2209/38* (2013.01)

(58) Field of Classification Search
USPC .......................................................... 707/703
See application file for complete search history.

(56) References Cited

U.S. PATENT DOCUMENTS

| | | | |
|---|---|---|---|
| 2018/0123779 A1* | 5/2018 | Zhang | H04L 9/0637 |
| 2018/0181768 A1* | 6/2018 | Leporini | G06F 21/6209 |
| 2018/0365686 A1 | 12/2018 | Kondo | |
| 2019/0013933 A1* | 1/2019 | Mercuri | G06F 21/602 |
| 2019/0116185 A1* | 4/2019 | Nagai | G06F 16/182 |
| 2019/0122317 A1* | 4/2019 | Hunn | G06Q 20/405 |
| 2019/0164157 A1* | 5/2019 | Balaraman | G06Q 20/102 |
| 2019/0303932 A1* | 10/2019 | Klaedtke | G06Q 20/22 |
| 2019/0378134 A1* | 12/2019 | Asari | H04L 9/3239 |
| 2019/0393722 A1* | 12/2019 | Stocker | H02J 13/0013 |
| 2020/0026785 A1* | 1/2020 | Patangia | G06F 16/27 |
| 2020/0034457 A1* | 1/2020 | Brody | H04L 9/0819 |
| 2020/0044857 A1* | 2/2020 | Snow | G06Q 20/3674 |
| 2020/0162473 A1* | 5/2020 | Mercuri | H04L 9/3239 |

FOREIGN PATENT DOCUMENTS

| | | |
|---|---|---|
| CN | 107833060 A | 3/2018 |
| CN | 109040029 A | 12/2018 |
| CN | 109150996 A | 1/2019 |
| CN | 109408373 A | 3/2019 |
| WO | WO 2020/062673 A1 | 4/2020 |

OTHER PUBLICATIONS

Luu, Loi, et al., "Making Smart Contracts Smarter", CCS '16, Vienna, Austria, Oct. 24-26, 2016, pp. 254-269.*

Sato, Tatsuya, et al., "Smart-Contract based System Operations for Permissioned Blockchain", NTMS 2018, Paris, France Feb. 26-28, 2018, pp. 1-6.*

Wang, Shuai, et al., "An Overview of Smart Contract: Architecture, Applications, and Future Trends", 2018 IEEE Intelligent Vehicles Symposium (IV), Changshu, Suzhou, China, Jun. 26-30, 2018, pp. 108-113.*

Abdellatif, Tesnim, et al., "Formal Verification of smart contracts based on users and blockchain behaviors models", NTMS 2018, Paris, France Feb. 26-28, 2018, pp. 1-5.*

Bogner, Andreas, et al., "A Decentralised Sharing App running a Smart Contract on the Ethereum Blockchain", IoT '16, Stuttgart, Germany, Nov. 7-9, 2016, pp. 177-178.*

Microsoft Computer Dictionary, 4th Edition, Microsoft Press, Redmond, WA, © 1999, pp. 25 and 28.*

Xu, Xiwei, et al., "The Blockchain as a Software Connector", WICSA 2016, Venice, Italy, Apr. 5-6, 2016, pp. 182-191.*

Idelberger, Florian, et al., "Evaluation of Logic-Based Smart Contracts for Blockchain Systems", RuleML 2016, Stony Brook, NY, Jul. 6-9, 2016, LNCS 9718, Springer International Publishing, pp. 167-183.*

Molina-Jimenez, Carlos, et al., "Implementation of Smart Contracts Using Hybrid Architectures with On- and Off-Blockchain Components", arXiv:1808.00093v1, Cornell University, Ithaca, NY, Jul. 31, 2018, 12 pages.*

Lin, Qijun, et al., "Food Safety Traceability System Based on Blockchain and EPCIS", IEEE Access, vol. 7, Feb. 27, 2019, pp. 20698-20707.*

Li, Chao, et al., "Scalable and Privacy-preserving Design of On/Off-chain Smart Contracts", ICDEW 2019, Macao, China, Apr. 8-12, 2019, pp. 7-12.*

Molina-Jimenez, Carlos, et al., "Implementation of Smart Contracts Using Hybrid Architectures with On and Off-Blockchain Components", SC 2018, Paris, France, Nov. 18-21, 2018, pp. 83-90.*

The International search report for International Application No. PCT/CN2019/076883, dated Dec. 4, 2019, 4 pages.

The written opinion of the International Search Authority for International Application No. PCT/CN2019/076883, dated Dec. 4, 2019, 4 pages.

Extended European Search Report for Application No. 19725902.1, dated Apr. 20, 2020.

Abdellatif, T, et al., "*Formal Verification of Smart Contracts Based on Users and Blockchain Behaviors Models*", 2018 9th IFIP International Conference on New Technologies, Mobility and Security, IEEE, Feb. 26, 2018, 5 pgs.

Written Opinion of Singapore Application No. 11201908551Q, front the Intellectual Property Office of Singapore, dated Nov. 6, 2020.

* cited by examiner

METHODS AND DEVICES FOR PERFORMING OFF-CHAIN TESTING ON SMART CONTRACT

CROSS REFERENCE TO RELATED APPLICATIONS

This application is a continuation of International Application No. PCT/CN2019/076883, filed Mar. 4, 2019, the entire content of which is incorporated herein by reference.

TECHNICAL FIELD

The specification relates generally to computer technologies and, more particularly, to methods and devices for performing an off-chain testing on a smart contract.

BACKGROUND

Blockchain systems, also known as distributed ledger systems (DLSs) or consensus systems, may enable participating entities to store data securely and immutably. Blockchain systems may include any DLSs, without referencing any particular use case, and may be used for public, private, and consortium blockchain networks. A public blockchain network is open for all entities to use the system and participate in the consensus process. A private blockchain network is provided for a particular entity, which centrally controls read and write permissions. A consortium blockchain network is provided for a select group of entities, which control the consensus process, and includes an access control layer.

A blockchain system maintains one or more blockchains. A blockchain is a data structure for storing data, such as transactions, that may prevent tampering and manipulation of the data by malicious parties.

A smart contract is a computer protocol that may automatically execute on the blockchain. For example, the smart contract may automatically complete a transaction upon certain terms are met. The transaction may involve transferring of data or cryptocurrencies. Results of the transaction may then be recorded in the blockchain.

Due to the decentralized and distributed nature of the blockchain, a transaction may be considered successful after all or a majority of the nodes of the blockchain reach consensus. The time for reaching consensus may be from a few seconds to several minutes. Thus, performing a testing on the smart contract on the blockchain may be time-consuming. Furthermore, once the transaction is finished, the results of the transaction are recorded in the blockchain and may not be altered. Therefore, the testing may cause an undesired change to the blockchain.

Further, as smart contracts are becoming more and more complex, testing a smart contract with multiple transactions may be needed. However, performing the testing with multiple transactions may be time-consuming and inefficient using conventional methods.

SUMMARY

In one aspect, a computer-implemented method for performing an off-chain testing on a smart contract includes: generating execution environment information for the smart contract, the execution environment information including at least one of transaction context information, blockchain information, or state information; providing an interface between the generated execution environment information and the smart contract; executing the smart contract based on the generated execution environment information and the provided interface; and storing an execution result of the smart contract.

In another aspect, a device for performing an off-chain testing on a smart contract includes: one or more processors; and one or more computer-readable memories coupled to the one or more processors and having instructions stored thereon; wherein the instructions are executable by the one or more processors to: generate execution environment information for the smart contract, the execution environment information including at least one of transaction context information, blockchain information, or state information; provide an interface between the generated execution environment information and the smart contract; execute the smart contract based on the generated execution environment information and the provided interface; and store an execution result of the smart contract.

In another aspect, a non-transitory computer-readable medium has stored therein instructions that, when executed by a processor of a device, cause the device to perform an off-chain testing method on a smart contract. The method includes: generating execution environment information for the smart contract, the execution environment information including at least one of transaction context information, blockchain information, or state information; providing an interface between the generated execution environment information and the smart contract; executing the smart contract based on the generated execution environment information and the provided interface; and storing an execution result of the smart contract.

BRIEF DESCRIPTION OF THE DRAWINGS

The accompanying drawings, which are incorporated in and constitute a part of this specification, illustrate embodiments. In the following description, which refers to the drawings, the same numbers in different drawings represent the same or similar elements unless otherwise represented.

DETAILED DESCRIPTION

Figure 1:
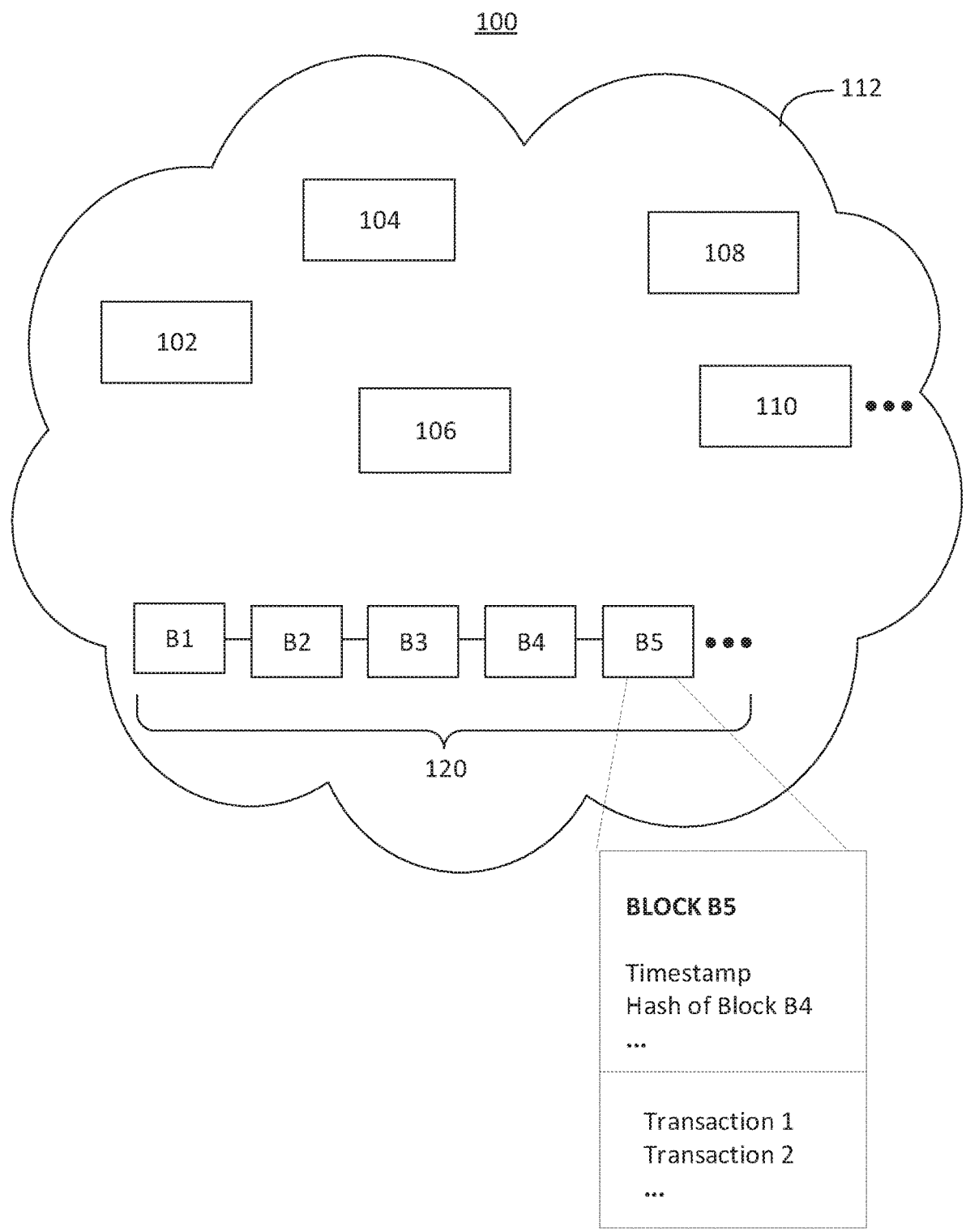
FIG. 1 is a schematic diagram of a blockchain system, according to an embodiment.

Embodiments of the specification provide methods and devices for performing an off-chain testing on a smart contract. The methods and devices may generate execution environment information for the smart contract. The execution environment information may include at least one of transaction context information, blockchain information, or state information. The methods and devices also provide an interface, e.g., an application program interface (API), between the generated execution environment information and the smart contract. The methods and devices further execute the smart contract based on the generated execution environment information and the provided interface and store an execution result of the smart contract.

Embodiments disclosed in the specification have one or more technical effects. In some embodiments, the methods and devices generate execution environment information to perform an off-chain testing on a smart contract, so that the smart contract does not need to be tested on the actual blockchain for which the smart contract is deployed. This allows for a reduced testing time and prevents the actual blockchain from undesired changes due to testing of the smart contract. In other embodiments, the methods and devices simulate only a part of an actual blockchain including, e.g., a current block and a previous block, by providing the corresponding blockchain information. This allows for the testing to be performed using reduced computer resources, thereby saving computer resources. In still other embodiments, the methods and devices provide an interface, such as an API, between the smart contract and the execution environment information. This allows for the smart contract to be integrated with the execution environment, so that the testing may be performed as if the smart contract were executed on the actual blockchain in which the smart contract is to be deployed. This also allows for an execution result of the smart contract, e.g., changes to the execution environment information, to be traceable, so that each operation performed by the smart contract may be identified and analyzed based on the execution result. In yet other embodiments, the methods and devices generate multiple transactions to perform the testing. This allows multiple functions of the smart contract to be automatically tested at substantially the same time.

The following description provides details of embodiments. In the embodiments, a blockchain is a data structure that stores data, e.g., transactions, in a way that the transactions may be immutable and subsequently verified. A blockchain includes one or more blocks. Each block is linked to a previous block immediately before it in the blockchain by including a cryptographic hash of the previous block. Each block also may include a timestamp, its own cryptographic hash, and one or more transactions. The transactions, which generally have already been verified by the nodes of the blockchain system, may be hashed and encoded into a data structure, such as a Merkle tree. In a Merkle tree, data at leaf nodes of the tree is hashed, and all hashes in each branch of the tree may be concatenated at a root of the branch. This process continues up the tree to the root of the entire tree, which stores a hash that is representative of all data in the tree. A hash purporting to be of a transaction stored in the tree can be quickly verified by determining whether it is consistent with the structure of the tree.

A blockchain system includes a network of computing nodes that manage, update, and maintain one or more blockchains. The network may be a public blockchain network, a private blockchain network, or a consortium blockchain network. For example, numerous entities, such as hundreds, thousands, or even millions of entities, can operate in a public blockchain network, and each of the entities operates at least one node in the public blockchain network. Accordingly, the public blockchain network can be considered a public network with respect to the participating entities. Sometimes, a majority of entities (nodes) must sign every block for the block to be valid and added to the blockchain of the blockchain network. Examples of public blockchain networks include particular peer-to-peer payment networks that leverage a distributed ledger, referred to as blockchain.

In general, a public blockchain network may support public transactions. A public transaction is shared with all of the nodes in the public blockchain network, and is stored in a global blockchain. A global blockchain is a blockchain replicated across all nodes, and all nodes are in perfect state consensus with respect to the global blockchain. To achieve consensus (e.g., agreement to the addition of a block to a blockchain), a consensus protocol is implemented in the public blockchain network. Examples of consensus protocols include proof-of-work (POW) (e.g., implemented in the some crypto-currency networks), proof-of-stake (POS), and proof-of-authority (POA).

In general, a private blockchain network may be provided for a particular entity, which centrally controls read and write permissions. The entity controls which nodes are able to participate in the blockchain network. Consequently, private blockchain networks are generally referred to as permissioned networks that place restrictions on who is allowed to participate in the network, and on their level of participation (e.g., only in certain transactions). Various types of access control mechanisms can be used (e.g., existing participants vote on adding new entities, a regulatory authority can control admission).

In general, a consortium blockchain network may be private among the participating entities. In a consortium blockchain network, the consensus process is controlled by an authorized set of nodes, one or more nodes being operated by a respective entity (e.g., a financial institution, insurance company). For example, a consortium of ten (10) entities (e.g., financial institutions, insurance companies) can operate a consortium blockchain network, each of which operates at least one node in the consortium blockchain network. Accordingly, the consortium blockchain network can be considered a private network with respect to the participating entities. In some examples, each entity (node) must sign every block in order for the block to be valid, and added to the blockchain. In some examples, at least a sub-set of entities (nodes) (e.g., at least 7 entities) must sign every block in order for the block to be valid, and added to the blockchain.

FIG. 1 illustrates a schematic diagram of a blockchain system 100, according to an embodiment. Referring to FIG. 1, the blockchain system 100 may include a plurality of nodes, e.g., nodes 102-110, configured to operate on a blockchain 120. The nodes 102-110 may form a network 112, such as a peer-to-peer (P2P) network. Each of the nodes 102-110 may be a computing device, such as a computer or a computer system, configured to store a copy of the blockchain 120, or may be software running on the computing device, such as a process or an application. Each of the nodes 102-110 may have a unique identifier.

The blockchain 120 may include a growing list of records in the form of data blocks, such as blocks B1-B5 in FIG. 1. Each of the blocks B1-B5 may include a block identifier, a timestamp, a cryptographic hash of a previous block, and data of the present block, which may be transactions such as monetary transactions. For example, as illustrated in FIG. 1, block B5 may include a timestamp, a cryptographic hash of block B4, and transaction data of block B5. Also for example, a hashing operation may be performed on the previous block to generate the cryptographic hash of the previous block. The hashing operation may convert inputs of various lengths into cryptographic outputs of a fixed length through a hash algorithm, such as SHA-256.

The nodes 102-110 may perform an operation on the blockchain 120. For example, when a node, e.g., the node 102, wants to store new data onto the blockchain 120, that node may generate a new block to be added to the blockchain 120 and broadcast the new block to other nodes, e.g., the nodes 104-110, in the network 112. Based on legitimacy of the new block, e.g., validity of its signature and transactions, the other nodes may determine to accept the new block, such that the node 102 and the other nodes may add the new block to their respective copies of the blockchain 120. As this process repeats, more and more blocks of data may be added to the blockchain 120.

The blockchain system 100 may operate according to one or more smart contracts. Each smart contract may be a computer protocol in the form of computer code that is incorporated into the blockchain 120, to facilitate, verify, or enforce the negotiation or performance of a contract. For example, a user of the blockchain system 100 may program agreed terms into a smart contract using a programming language, such as C++, Java, Solidity, Python, etc., and when the terms are met, the smart contract may be automatically executed by the blockchain system 100, e.g., to perform a transaction. Also for example, the smart contract may include a plurality of subroutines or functions, each of which may be a sequence of program instructions that performs a specific task. The smart contract may be operational code that is fully or partially executed without human interaction.

As each of the nodes 102-110 may store a copy of the blockchain 120, each of the nodes 102-110 may also have access to a copy of the smart contract included in the blockchain 120. In an embodiment, the smart contract may be assigned with an address on the blockchain 120, e.g., after the smart contract is compiled into operational code. The address of the smart contract is configured or used to locate the smart contract on the blockchain 120.

In an embodiment, a node (e.g., the node 102) in the blockchain system 100 may perform a transaction based on a copy of the smart contract. After a new block including the transaction is broadcasted to the blockchain system 100, other nodes in the blockchain system 100 may verify the new block. After the new block is verified by a majority or all of the nodes in the blockchain system 100, the new block may be added to the respective copies of the blockchain 120 on those nodes, and the transaction is complete.

In an embodiment, each smart contract in the blockchain system 100 may be tested to ensure proper operation using the devices and methods described below. These devices and methods may perform an off-chain testing on the smart contract, not on the actual blockchain 120 for which the smart contract is deployed.

Figure 2:
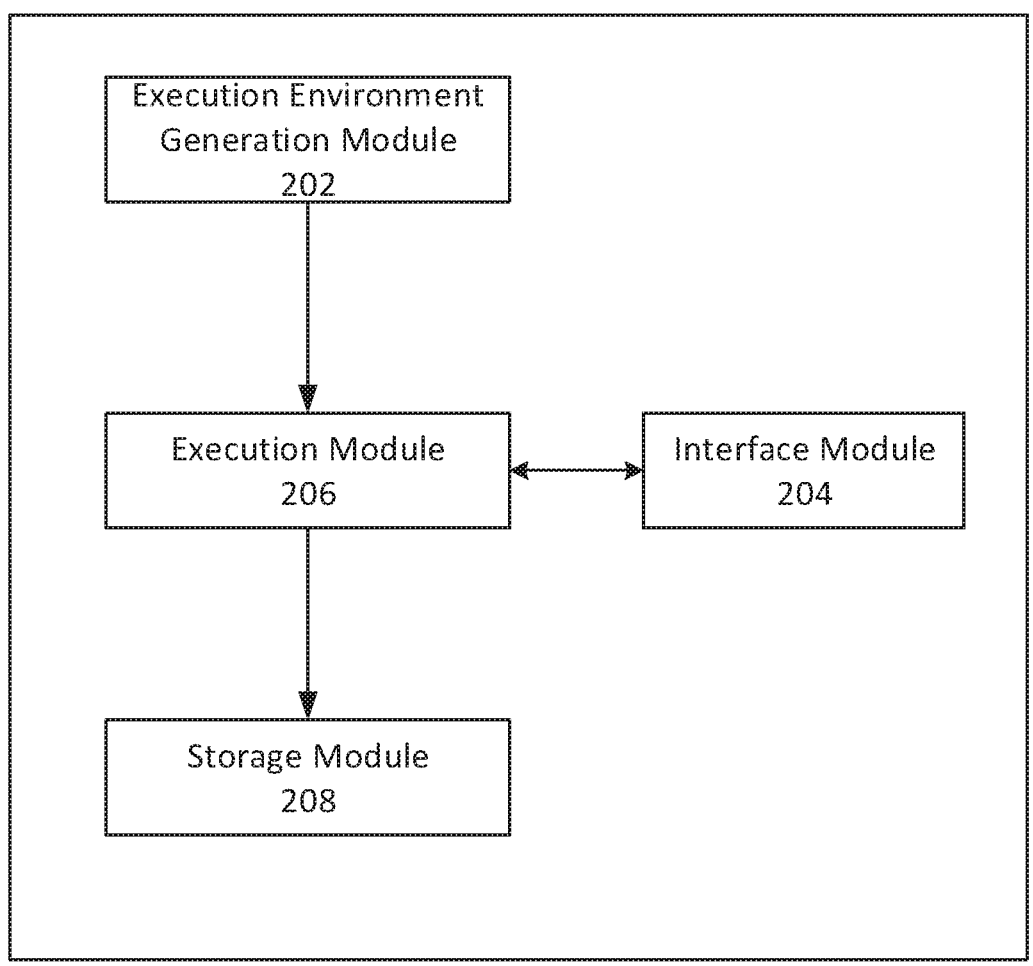
FIG. 2 is a block diagram of an apparatus for performing an off-chain testing on a smart contract, according to an embodiment.

FIG. 2 is a block diagram of an apparatus 200 for performing an off-chain testing on a smart contract, according to an embodiment. For example, the apparatus 200 may perform the testing on the smart contract before the smart contract is deployed into an actual blockchain, such as the blockchain 120 (FIG. 1). Referring to FIG. 2, the apparatus 200 may include an execution environment generation module 202, an interface module 204, an execution module 206, and a storage module 208.

The execution environment generation module 202 may generate execution environment information for the smart contract. The generated execution environment information may include at least one of transaction context information, blockchain information, or state information.

In an embodiment, the transaction context information may be context information regarding a transaction that may be provided, e.g., simulated, by the apparatus 200 or received by the apparatus 200 through user input. For example, the simulated transaction may be that a first party transfers an amount of money to a second party upon a term, e.g., the first party receiving a copy of a digital book, is met, and the transferring of the amount of money may be implemented by a transferring subroutine or function of the smart contract. The simulated transaction may make the smart contract believe that the copy of the digital book has been received by the first party and, therefore, trigger the execution of the smart contract.

In an embodiment, the transaction context information may include an address of the smart contract, a transaction identifier, party information of the transaction, etc. As described above, the address of the smart contract is configured or used to locate the smart contract on a blockchain. The transaction identifier is configured or used to identify the transaction. For example, when a plurality of transactions are provided by the apparatus 200, each of the transactions may be assigned a corresponding transaction identifier. In addition, testing results may also be traced and identified by the transaction identifier. The party information of the transaction may include information relating to parties associated with the transaction, such as account information.

In an embodiment, the blockchain information may be information regarding a blockchain that is provided, e.g., simulated, by the apparatus 200. The blockchain information may include a block identifier of a current block, a timestamp of the current block, a hash value of a previous block, etc. As described above, each block in the actual blockchain 120 (FIG. 1) may include a block identifier, a timestamp, and a cryptographic hash of the previous block. The apparatus 200 may simulate a part of an actual blockchain including, e.g., the current block and the previous block, by providing the corresponding blockchain information.

In an embodiment, the state information is configured or used to indicate a state of the smart contract. For example, the state information may include parameter information of the smart contract, and transaction information such as balance information of each party in the transaction. The balance information may include a current balance of each party, one or more changes that result in the current balance of each party, and the like.

The interface module 204 may provide one or more interfaces, e.g., application program interfaces (APIs), between the generated execution environment information and the smart contract. For example, the APIs may include an API for obtaining the generated execution environment information for the smart contract, an API for performing a hash operation, an API for encryption, an API for maintaining a log, etc.

The execution module 206 may execute the smart contract based on the execution environment information generated by the execution environment generation module 202 and the interfaces provided by the interface module 204. The execution module 206 may generate an execution result for the smart contract.

The storage module 208 may store the execution result generated by the execution module 206. For example, the storage module 208 may store the execution result into a file system or a buffer, to facilitate subsequent verification of the execution result.

Each of the execution environment generation module 202, the interface module 204, the execution module 206, and the storage module 208 may be software, or hardware, or a combination of software and hardware. For example, each of the execution environment generation module 202, the interface module 204, the execution module 206, and the storage module 208 may be implemented using a processor executing instructions stored in a memory. Also for example, each of the execution environment generation module 202, the interface module 204, the execution module 206, and the storage module 208 may be implemented with one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic components, for performing the below described method.

Figure 3:
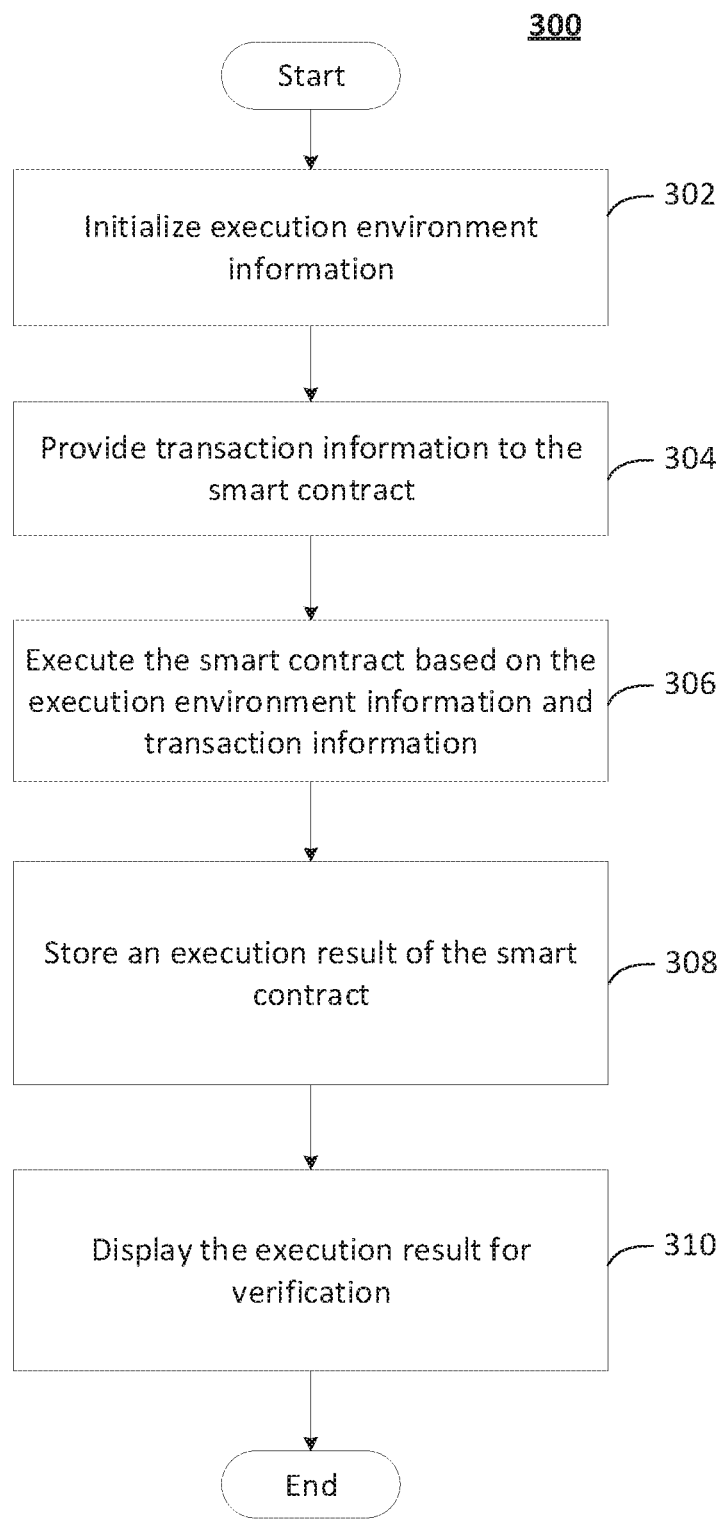
FIG. 3 is a flow chart of a method for performing an off-chain testing on a smart contract, according to an embodiment.

FIG. 3 illustrates a flow chart of a method 300 for performing an off-chain testing on a smart contract, according to an embodiment. For example, the method 300 may be performed by the apparatus 200 (FIG. 2). Referring to FIG. 3, the method 300 may include the following steps.

In step 302, execution environment information for performing the testing is initialized. As described above, the execution environment information may include transaction context information, blockchain information, and state information. Accordingly, the execution environment information may be initialized by setting corresponding parameters to predetermined values.

In step 304, transaction information is provided to the smart contract under testing. For example, providing the transaction information to the smart contract may trigger execution of the smart contract based on the transaction information. Also for example, the transaction information may be information regarding transferring of data or cryptocurrencies.

In step 306, the smart contract is executed, e.g., by the execution module 206 (FIG. 2), based on the execution environment information and the transaction information. For example, the execution module 206 may acquire the transaction context information and the blockchain information from the execution environment information generation module 202 and invoke the APIs from the interface module 204 to execute the smart contract.

In step 308, an execution result of the smart contract is stored. In some embodiments, the smart contract may be tested based on a plurality of transactions, and an execution process and an execution result for each transaction may be sequentially stored, until the testing is finished for all of the transactions.

In step 310, the stored execution result may be displayed for verification. For example, the execution result of the smart contract may be compared with an anticipated result of the testing, to determine if the execution result is consistent with the anticipated result. Changes in the execution environment information caused by the testing may also be verified, so that an error that happens in the smart contract during the testing may be identified and further corrected. It is appreciated that the stored execution result may be verified by hardware, or software, or a combination of hardware and software.

Figure 4:
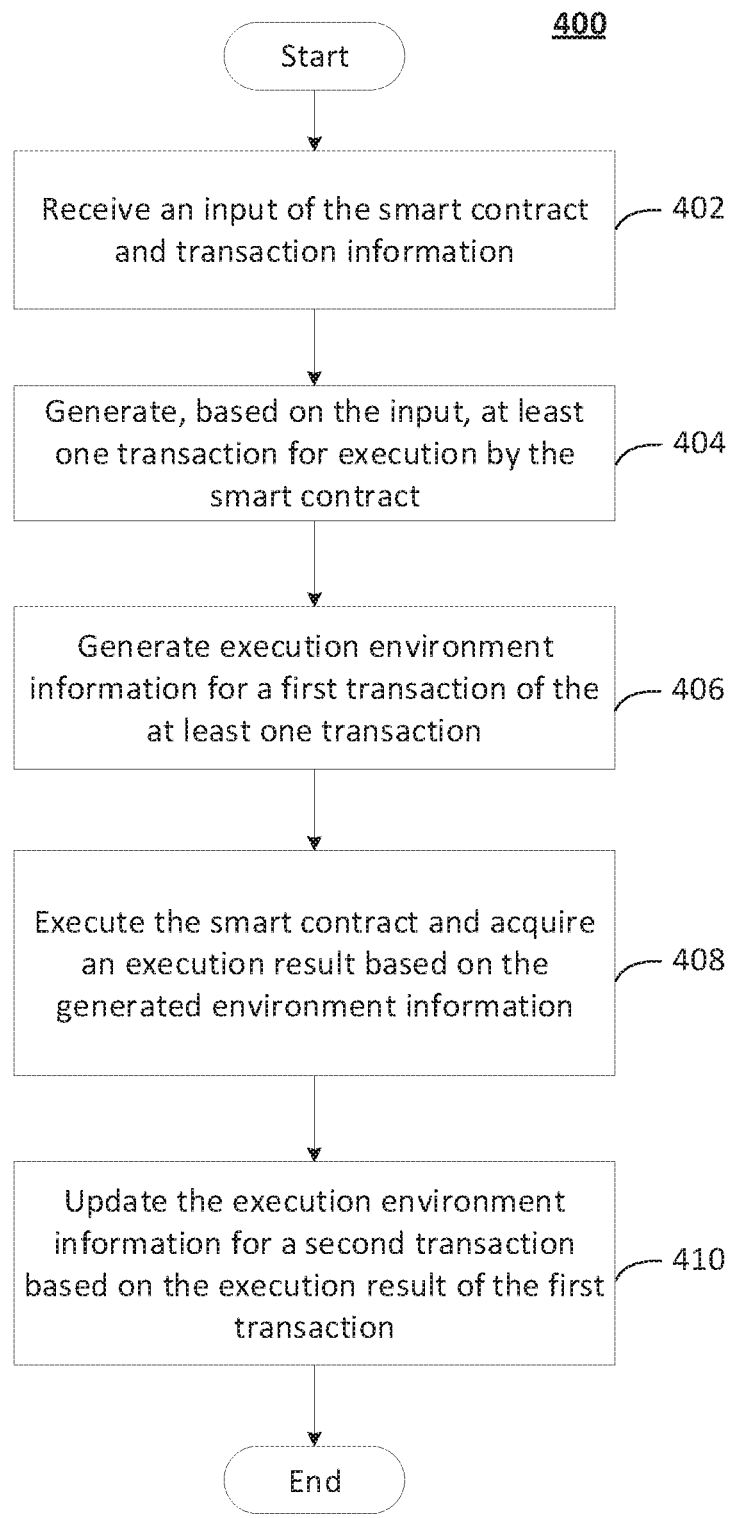
FIG. 4 is a flow chart of a method for performing an off-chain testing on a smart contract, according to an embodiment.

FIG. 4 illustrates a flow chart of a method 400 for performing an off-chain testing on a smart contract, according to another embodiment. The method 400 may be performed by a computer system. The computer system may include a memory storing a set of instructions and at least one processor to execute the set of instructions to cause the computer system to perform the method 400. Referring to FIG. 4, the method 400 may include the following steps.

In step 402, the computer system may receive an input of the smart contract and transaction information. The smart contract may include a plurality of subroutines or functions, and the testing is configured according to the subroutines or functions. The transaction information may correspond to at least one transaction for testing the smart contract.

In step 404, the computer system may generate, based on the input, a transaction for execution by the smart contract. It is appreciated that the transaction may not be an actual transaction, but include the transaction information that is typically used in an actual transaction to trigger the smart contract to operate accordingly.

In step 406, the computer system may generate execution environment information for the smart contract. As described above, the execution environment information may include transaction context information, blockchain information, state information, etc. By providing the execution environment information, the testing may be performed as if the smart contract were executed on an actual blockchain in which the smart contract is to be deployed.

In an embodiment, the testing on the smart contract is configured according to a type of the actual blockchain in which the smart contract is to be deployed, and the computer system may generate the execution environment information consistent with the type of the actual blockchain. For example, the computer system may generate the execution environment information consistent with an Ethereum blockchain. As a result, the generated execution environment information may provide an execution environment similar to that where the smart contract is deployed.

In step 408 the computer system may execute the smart contract based on the generated execution environment information, and acquire an execution result of the smart contract. The execution result may include data generated by each subroutine and function of the smart contract. The execution result may also include data indicating one or more changes in the blockchain information or the state information. For example, a successful transaction may result in a new block being added to the blockchain and, accordingly, the execution result may include data indicating a change in the blockchain information. Also for example, a successful transaction may result in a change in account information, e.g., a change in a balance, and accordingly, the execution result may include data indicating a change in the state information. In some embodiments, the computer system may trigger the execution of the smart contract by sending the transaction to the smart contract.

In step 410, based on the execution result of the transaction as a first transaction, the computer system may update the execution environment information for a second transaction. The computer system may generate transaction context information corresponding to the second transaction, which may include a transaction identifier and party information of the second transaction. The computer system may further update the execution environment information based on the generated transaction context information and the execution result from the first transaction. As described above, the execution result may include data indicating one or more changes in the blockchain information or the state information. By including the changes into the updated execution environment information, the computer system may provide an execution environment similar to that in the actual blockchain, so as to accurately and efficiently perform the off-chain testing on the smart contract based on the second transaction.

In an embodiment, the computer system may generate multiple transactions for performing the off-chain testing on the smart contract. A memory of the computer system may record execution results from the multiple transactions for verification. Accordingly, efficiency of testing the smart contract may be improved by executing the smart contract off an actual blockchain.

Figure 5:
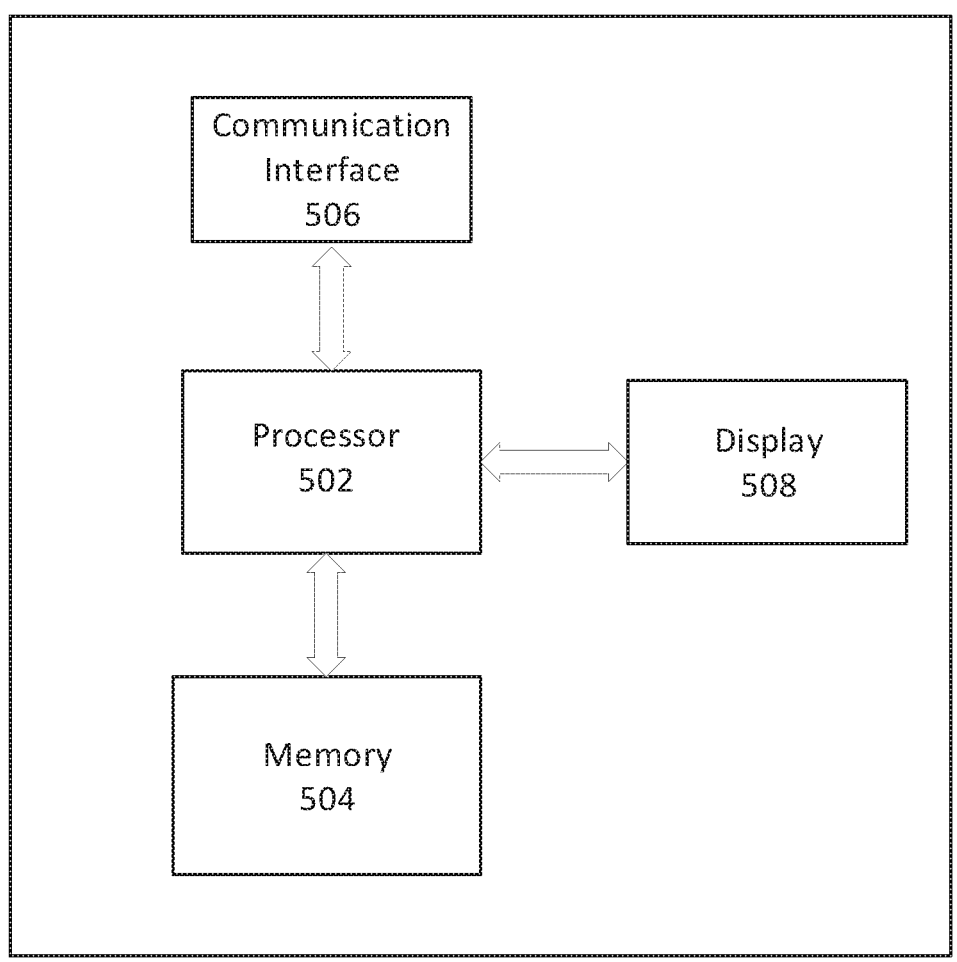
FIG. 5 is a block diagram of a device for performing an off-chain testing on a smart contract, according to an embodiment.

FIG. 5 is a block diagram of a device 500 for performing an off-chain testing on a smart contract, according to an embodiment. For example, the device 500 may be implemented using a computer system. Referring to FIG. 5, the device 500 may include a processor 502, a memory 504, a communication interface 506, and a display 508.

The processor 502 may execute instructions to perform the above described methods for performing an off-chain testing on a smart contract. The processor 502 may include one or more modules which facilitate the testing. For example, the processor 502 may include the execution environment generation module 202, the interface module 204, the execution module 206, and the storage module 208 (FIG. 2).

The memory 504 may store a smart contract and instructions for performing the above described methods for performing an off-chain testing on the smart contract. The smart contract may be stored as a source file, and the source file may be executed to perform functions of the smart contract. For example, the device 500 may compile the source file and execute the complied file. The smart contract may also be stored as a complied file, so that the device 500 may execute the smart contract directly. The memory 504 may also store information generated before, during, or after the execution of the smart contract. The memory 504 may be implemented as any type of volatile or non-volatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, or a magnetic or optical disk.

The communication interface 506 may facilitate communications between the device 500 and other devices. The communication interface 506 may support one or more communication standards, such as an Internet standard or protocol, an Integrated Services Digital Network (ISDN) standard, etc.

The display 508 may display an execution result of the smart contract when an off-chain testing on the smart contract is performed. For example, the display 508 may be a liquid crystal display (LCD). Also for example, the display 508 may include a touch screen to receive user input.

In an embodiment, there is also provided a computer program product. The computer program product may include a non-transitory computer-readable storage medium having computer-readable program instructions thereon for causing a processor to carry out the above-described methods.

The computer-readable storage medium may be a tangible device that can store instructions for use by an instruction execution device. The computer-readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer-readable storage medium includes the following: a portable computer diskette, a hard disk, a random access memory (RAM), a read-only memory (ROM), an erasable programmable read-only memory (EPROM), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing.

The computer-readable program instructions for carrying out the above-described methods may be assembler instructions, instruction-set-architecture (ISA) instructions, machine instructions, machine dependent instructions, microcode, firmware instructions, state-setting data, or source code or object code written in any combination of one or more programming languages, including an object oriented programming language, and conventional procedural programming languages. The computer-readable program instructions may execute entirely on a computer system as a stand-alone software package, or partly on a first computer and partly on a second computer remote from the first computer. In the latter scenario, the second, remote computer may be connected to the first computer through any type of network, including a local area network (LAN) or a wide area network (WAN).

The computer-readable program instructions may be provided to a processor of a general-purpose or special-purpose computer, or other programmable data processing apparatus to produce a machine, such that the instructions, which execute via the processor of the computer or other programmable data processing apparatus, create means for implementing the above-described methods.

The flow charts and diagrams in the figures illustrate the architecture, functionality, and operation of possible implementations of devices, methods, and computer program products according to various embodiments of the specification. In this regard, a block in the flow charts or diagrams may represent a software program, segment, or portion of code, which comprises one or more executable instructions for implementing specific functions. It should also be noted that, in some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the diagrams and/or flow charts, and combinations of blocks in the diagrams and flow charts, may be implemented by special purpose hardware-based systems that perform the specified functions or acts, or combinations of special purpose hardware and computer instructions.

It is appreciated that certain features of the specification, which are, for clarity, described in the context of separate embodiments, may also be provided in combination in a single embodiment. Conversely, various features of the specification, which are, for brevity, described in the context of a single embodiment, may also be provided separately or in any suitable subcombination or as suitable in any other described embodiment of the specification. Certain features described in the context of various embodiments are not to be considered essential features of those embodiments, unless noted as such.

Although the specification has been described in conjunction with specific embodiments, many alternatives, modifications and variations will be apparent to those skilled in the art. Accordingly, the following claims embrace all such alternatives, modifications and variations that fall within the terms of the appended claims.

What is claimed is:

1. A computer-implemented method for performing an off-chain testing on a smart contract, comprising:
    generating execution environment information for the smart contract, the execution environment information including at least one of transaction context information, blockchain information, or state information;

providing an interface between the generated execution environment information and the smart contract;
executing the smart contract based on the generated execution environment information and the provided interface; and
storing an execution result of the smart contract, wherein the storing the execution result comprises storing data indicating a change in at least one of the blockchain information or the state information,
wherein the generating the execution environment information, the providing the interface, the executing the smart contract, and the storing the execution result of the smart contract are performed before the smart contract is deployed into a blockchain, thereby implementing the off-chain testing on the smart contract.

2. The method of claim 1, where the generating the execution environment information comprises:
generating the transaction context information to include at least one of an address of the smart contract, a transaction identifier of a transaction, or party information of the transaction.

3. The method of claim 1, where the generating the execution environment information comprises:
generating the blockchain information to include at least one of a block identifier for a current block, a timestamp of the current block, and a hash value of a previous block.

4. The method of claim 1, where the generating the execution environment information comprises:
generating the state information to include at least one of parameter information of the smart contract or transaction information.

5. The method of claim 1, wherein the providing the interface comprises:
providing an application program interface (API) between the generated execution environment information and the smart contract.

6. The method of claim 1, wherein the transaction context information corresponds to a first transaction, the method further comprising:
generating updated transaction context information corresponding to a second transaction; and
updating the execution environment information with the data indicating a change in at least one of the blockchain information or the state information, and the updated transaction context information.

7. The method of claim 6, further comprising:
executing the smart contract based on the updated execution environment information and the provided interface; and
storing another execution result of the smart contract.

8. The method of claim 1, further comprising:
displaying the execution result of the smart contract for verification.

9. A device for performing an off-chain testing on a smart contract, comprising:
one or more processors; and
one or more computer-readable memories coupled to the one or more processors and having instructions stored thereon that are executable by the one or more processors, wherein the one or more processors are configured to:
generate execution environment information for the smart contract, the execution environment information including at least one of transaction context information, blockchain information, or state information;

provide an interface between the generated execution environment information and the smart contract;
execute the smart contract based on the generated execution environment information and the provided interface; and
store an execution result of the smart contract, wherein storing the execution result comprises storing data indicating a change in at least one of the blockchain information or the state information,
wherein generating the execution environment information, providing the interface, executing the smart contract, and storing the execution result of the smart contract are performed before the smart contract is deployed into a blockchain, thereby implementing the off-chain testing on the smart contract.

10. The device of claim 9, wherein in generating the execution environment information, the one or more processors are further configured to:
generate the transaction context information to include at least one of an address of the smart contract, a transaction identifier of a transaction, or party information of the transaction.

11. The device of claim 9, wherein in generating the execution environment information, the one or more processors are further configured to:
generate the blockchain information to include at least one of a block identifier for a current block, a timestamp of the current block, and a hash value of a previous block.

12. The device of claim 9, wherein in generating the execution environment information, the one or more processors are further configured to:
generate the state information to include at least one of parameter information of the smart contract or transaction information.

13. The device of claim 9, wherein in providing the interface, the one or more processors are further configured to:
provide an application program interface (API) between the generated execution environment information and the smart contract.

14. The device of claim 9, wherein the transaction context information corresponds to a first transaction, and the one or more processors are further configured to:
generate updated transaction context information corresponding to a second transaction; and
update the execution environment information with the data indicating a change in at least one of the blockchain information or the state information, and the updated transaction context information.

15. The device of claim 14, wherein the one or more processors are further configured to:
execute the smart contract based on the updated execution environment information and the provided interface; and
store another execution result of the smart contract.

16. The device of claim 9, wherein the one or more processors are further configured to:
display the execution result of the smart contract for verification.

17. A non-transitory computer-readable medium having stored therein instructions that, when executed by a processor of a device, cause the device to perform a method for performing an off-chain testing on a smart contract, the method comprising:
generating execution environment information for the smart contract, the execution environment information including at least one of transaction context information, blockchain information, or state information;

providing an interface between the generated execution environment information and the smart contract;

executing the smart contract based on the generated execution environment information and the provided interface; and storing an execution result of the smart contract, wherein the storing the execution result comprises storing data indicating a change in at least one of the blockchain information or the state information, wherein the generating the execution environment information, the providing the interface, the executing the smart contract, and the storing the execution result of the smart contract are performed before the smart contract is deployed into a blockchain, thereby implementing the off-chain testing on the smart contract.

* * * * *